(12) United States Patent
Luthi et al.

(10) Patent No.: US 9,683,669 B2
(45) Date of Patent: Jun. 20, 2017

(54) DELAY VALVE FOR A HYDRAULIC WORK SUPPORT

(71) Applicant: VEKTEK, INC., Emporia, KS (US)

(72) Inventors: Aaron Vernon Luthi, Madison, KS (US); Gregory A. Yotz, Gridley, KS (US); Daniel Lee Goentzel, Emporia, KS (US)

(73) Assignee: Vektek, Inc., Emporia, KS (US)

( * ) Notice: Subject to any disclaimer, the term of this patent is extended or adjusted under 35 U.S.C. 154(b) by 190 days.

(21) Appl. No.: 14/837,897

(22) Filed: Aug. 27, 2015

(65) Prior Publication Data

US 2017/0059047 A1    Mar. 2, 2017

(51) Int. Cl.
*F16K 31/12* (2006.01)
*F16K 15/18* (2006.01)
*F16K 1/52* (2006.01)
*F16K 31/122* (2006.01)
*F16K 31/124* (2006.01)

(52) U.S. Cl.
CPC ............. *F16K 15/186* (2013.01); *F16K 1/52* (2013.01); *F16K 31/1221* (2013.01); *F16K 31/1223* (2013.01); *F16K 31/1245* (2013.01)

(58) Field of Classification Search
CPC .... F16K 1/52; F16K 31/1221; F16K 31/1223; F16K 31/1245; G05D 7/0123; G05D 7/0133; G05D 7/014; G05D 16/10; G05D 16/103; G05D 16/106
USPC .......... 137/494, 497, 505.13; 251/15, 20, 23
See application file for complete search history.

(56) References Cited

U.S. PATENT DOCUMENTS

| | | | | |
|---|---|---|---|---|
| 2,793,619 A | * | 5/1957 | Di Tirro | G05D 16/10 137/494 |
| 2,985,490 A | * | 5/1961 | Gates | G05D 16/0663 137/102 |
| 3,559,688 A | * | 2/1971 | Fischer | G05D 16/10 137/627.5 |
| 3,626,968 A | | 12/1971 | Hancock | |
| 4,075,928 A | * | 2/1978 | Bitonti | F16K 31/363 137/110 |
| 4,133,343 A | * | 1/1979 | Carroll | G05D 16/10 137/505.11 |
| 4,271,864 A | * | 6/1981 | Neff | G05D 16/10 137/505.18 |
| 4,898,203 A | * | 2/1990 | Kobelt | F16K 27/003 137/269 |

(Continued)

*Primary Examiner* — Eric Keasel
(74) *Attorney, Agent, or Firm* — Hovey Williams LLP

(57) ABSTRACT

An unclamp delay valve for delaying release of hydraulic pressure in a hydraulic holding device. The unclamp delay valve may have a check valve allowing fluid to flow between an inlet port and an outlet port when held open by a piston translatable within a piston chamber. The check valve blocks fluid from flowing between the outlet port and the inlet port when released due to hydraulic fluid filling the piston chamber and translating the piston away from the check valve. To reopen the check valve, hydraulic pressure is released via the inlet port and slowly drains from a small orifice fluidly coupling the piston chamber and the inlet port, causing the piston to return to again open the check valve. A delay is thus created by the time it takes for the piston chamber to drain, thus opening the check valve to release hydraulic pressure therethrough.

20 Claims, 15 Drawing Sheets

(56) References Cited

U.S. PATENT DOCUMENTS

| | | | |
|---|---|---|---|
| 5,490,539 A * | 2/1996 | Ottestad | G05D 7/014 137/486 |
| 5,497,622 A | 3/1996 | Nam | |
| 6,907,815 B2 | 6/2005 | Kim | |
| 8,899,258 B2 * | 12/2014 | Ginder | F16K 1/00 137/505.13 |
| 2011/0126920 A1 | 6/2011 | Rub | |
| 2013/0081725 A1 | 4/2013 | Arisato | |

* cited by examiner

DELAY VALVE FOR A HYDRAULIC WORK SUPPORT

BACKGROUND

Work supports are used in various manufacturing processes to hold a part in place on a fixture while the part is machined by a computer numerical control (CNC) machine tool or the like. The work support may be hydraulically actuated to provide clamping or stabilizing force to at least one side of the part.

In some instances, the work support provides clamping force to one side of the part while another clamping device provides clamping force to an opposing side of the part. When hydraulic pressure is released from the work support too quickly during an unclamping sequence, before the clamping device clamping over the top of the part has retracted and released all of its clamping forces, undesired deformation of the part may occur.

Thus, there is a need for a device and/or method for controlling this unclamping sequence that overcomes these and other disadvantages of the prior art.

SUMMARY OF THE INVENTION

Embodiments of the present invention solve the above-mentioned problems and provide a distinct advance in the art of unclamp sequencing of work supports or other hydraulic elements.

One embodiment of the invention is an unclamp delay valve configured to provide a time delay prior to unclamping or releasing hydraulic pressure from hydraulic devices connected downstream, such as hydraulic holding devices, hydraulic work supports, or hydraulic clamps. The unclamp delay valve may have a check valve allowing fluid to flow between an inlet port and an outlet port when held open by a piston translatable within a piston chamber. The check valve may block fluid from flowing between the outlet port and the inlet port when released due to hydraulic fluid filling the piston chamber and translating the piston away from the check valve. The unclamp delay valve may also include a flow control device between the inlet port and the piston chamber. The flow control device may have an outer surface, a flow control passageway with an inner surface, and a flow control valve configured to actuate between a naturally closed state in which fluid is blocked from passing through the flow control passageway and an open state achieved by force of hydraulic fluid flowing in through the inlet port.

To reopen the check valve, hydraulic pressure is released via the inlet port and slowly drains from a small orifice fluidly coupling the piston chamber and the inlet port, causing the piston to return to again open the check valve. Specifically, the orifice may be provided between the outer surface of the flow control device and the housing. A size of the orifice may be adjustable for controlling how quickly fluid flows out from the piston chamber to the inlet port while the flow control valve is in a closed state and the hydraulic fluid is flowing out of the inlet port. The size of the orifice is thus proportional to the time delay between a release of hydraulic fluid outward through the inlet port and a release of hydraulic fluid from within the piston chamber that returns the piston to the first stroke position, thus actuating the check valve into the open configuration and thereby unclamping or releasing hydraulic pressure from hydraulic devices connected downstream.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 5b is an enlarged cross-sectional elevation view of an orifice provided between a housing and the flow control device of FIG. 5a;

Figure 11:
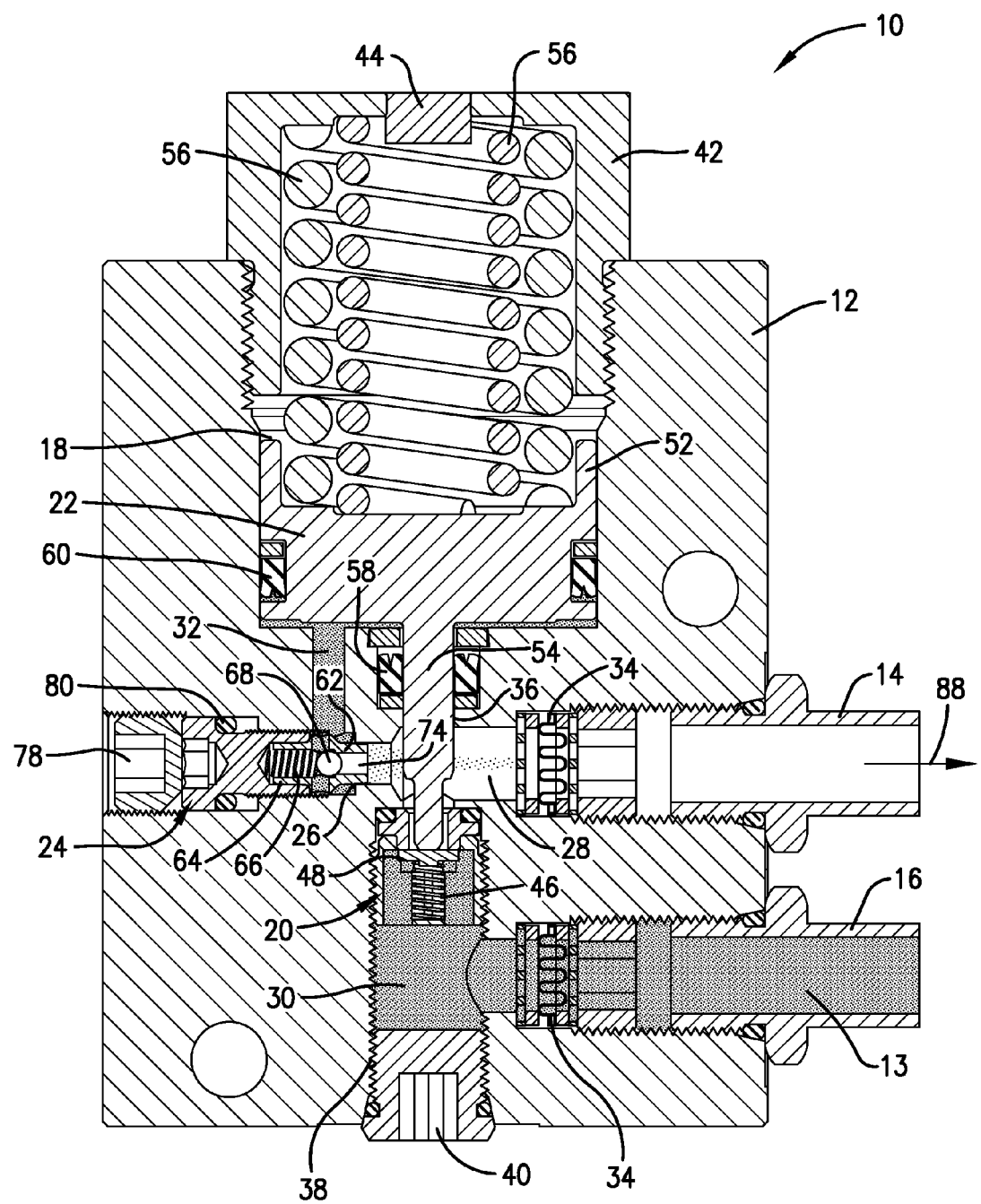
FIG. 11 is a cross-sectional elevation view of the unclamp delay valve of FIG. 10, illustrating the piston contacting the closed check valve.
Figure 12:
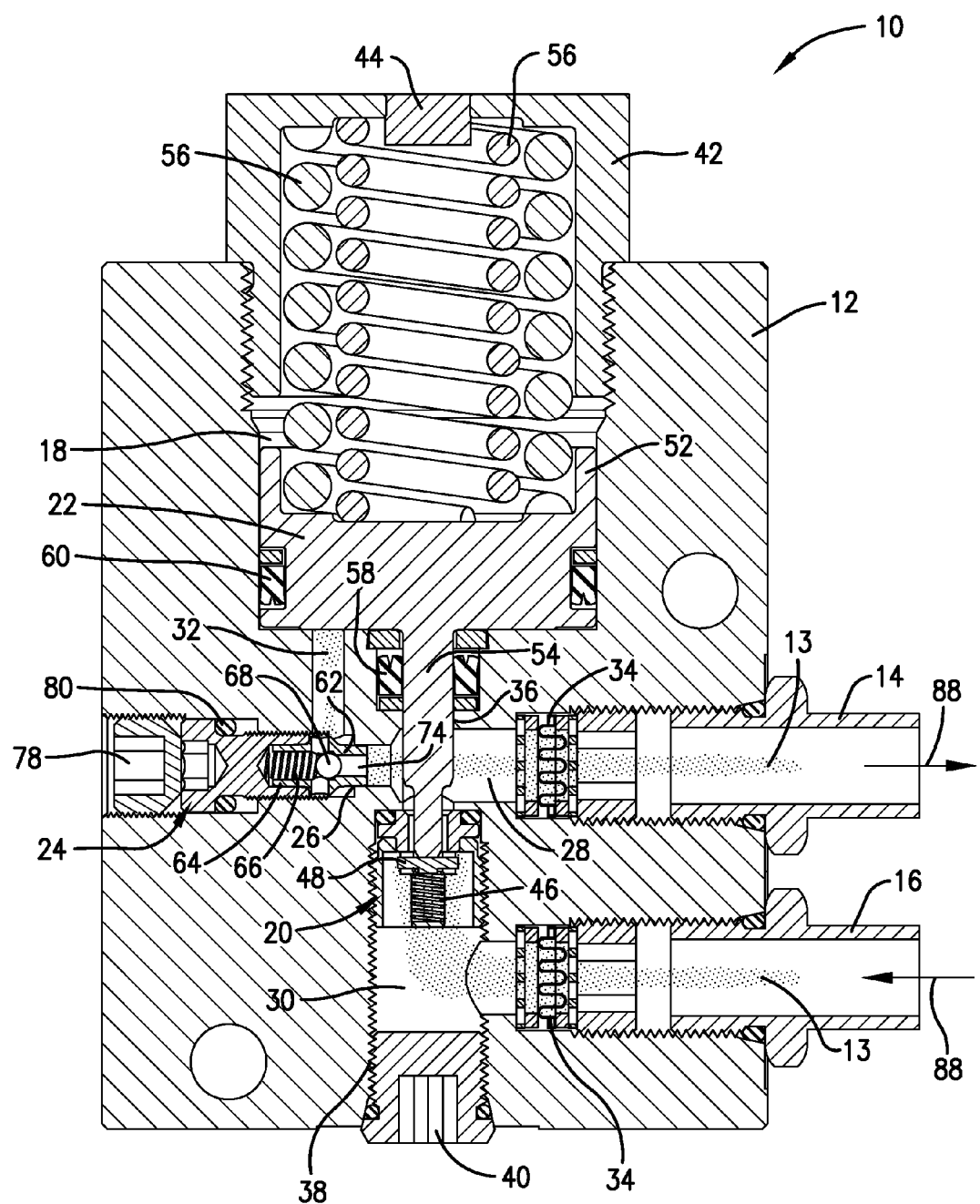
Figure 13:
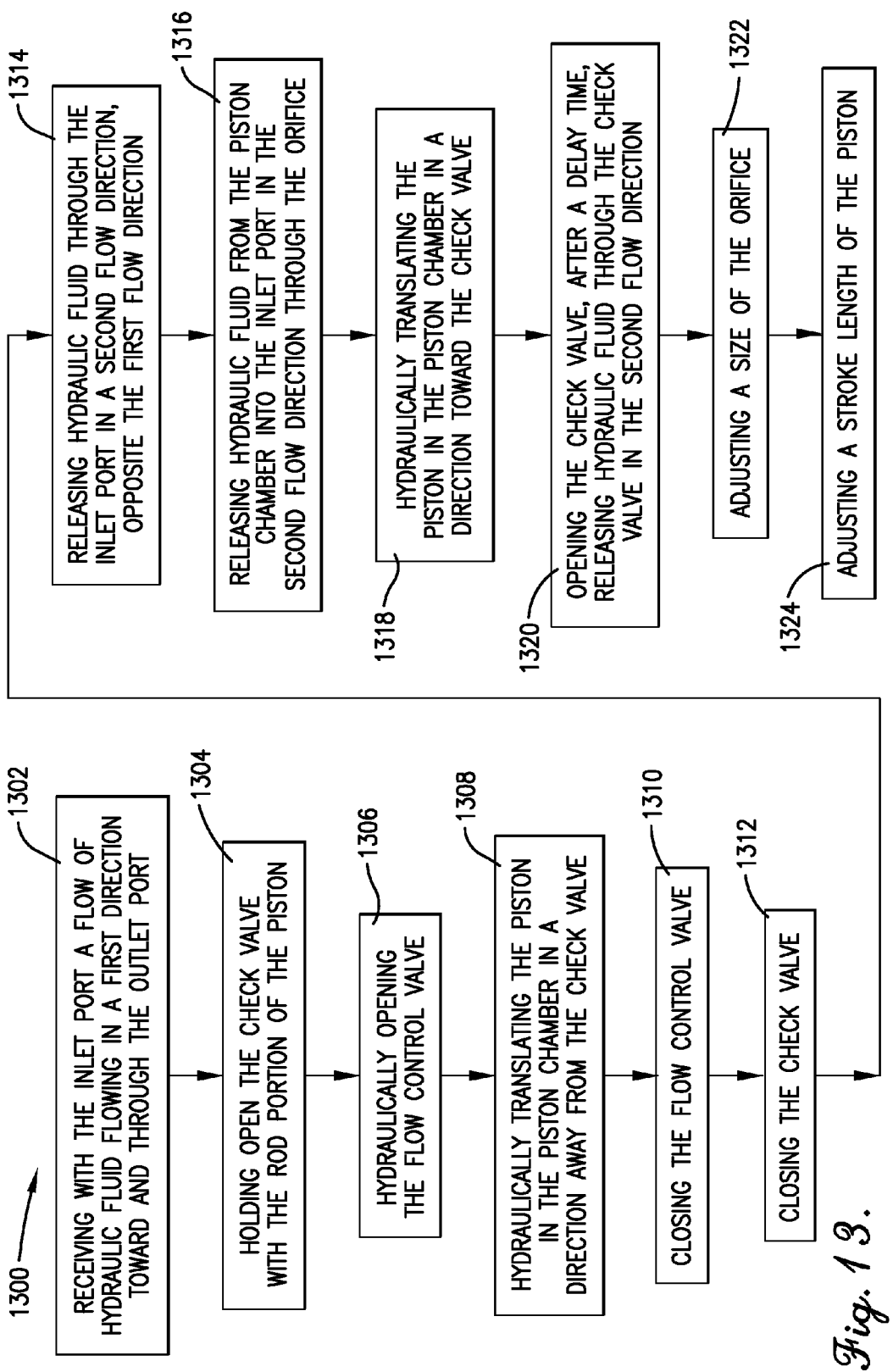

FIG. 12 is a cross-sectional elevation view of the unclamp delay valve of FIG. 11, illustrating the piston opening the check valve, releasing fluid therethrough in the second flow direction; and FIG. 13 is a flow chart illustrating a method of providing instantaneous hydraulic flow in a first flow direction and then delayed hydraulic flow in an opposite second flow direction in accordance with embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

An unclamp delay valve 10, constructed in accordance with embodiments of the present invention, is illustrated in FIGS. 1-12. The unclamp delay valve 10 may be configured to fluidly couple an upstream hydraulic device with a downstream hydraulic device. For example, the upstream hydraulic device may include a pump or other source of hydraulic fluid, a directional control valve, hydraulic clamps, sequence valves, work supports, or the like connected upstream of the unclamp delay valve 10. The downstream hydraulic device may include, for example, a hydraulic holding device, a hydraulic work support, hydraulic clamps, hydraulic fixtures, or various single acting hydraulic devices connected downstream of the unclamp delay valve 10. Hydraulic fluid is illustrated in FIGS. 3-12 by a collection of dots 13, which are illustrated as denser when hydraulic pressure is greater and more spaced out when hydraulic pressure is lessened or released.

An unclamp delay valve 10 may comprise a housing 12 with an inlet port 14, an outlet port 16 and a piston chamber 18, a check valve 20 controlling fluid flow between the inlet port 14 and the outlet port 16, a piston 22 translatable within the piston chamber 18, and a flow control device 24 configured to control fluid flow between the inlet port 14 and the piston chamber 18. The unclamp delay valve 10 may also have formed therein at least one orifice 26, which may be formed by the fluid control device 24 and/or the housing 12 and may fluidly couple the piston chamber 18 with the inlet port 14. A size of the orifice 26 may determine a delay time of the unclamp delay valve 10 during unclamping of downstream devices, as later described herein.

The housing 12 may be formed of any material known in the art and may be, for example, a block-type manifold housing, a cartridge-type housing, or any suitable hydraulic housing known in the art. The manifold housing, for example, may house both the unclamp delay valve 10 components and other valves and hydraulic components fluidly coupled therewith. In other embodiments of the invention, the housing 10 may be a stand-alone device externally plumbed for hydraulic coupling with other hydraulic components. In some embodiments of the invention, the housing may also combine the unclamp delay valve 10 with a sequence valve for one-piece packaging of these components. The sequence valve (not shown) may be fluidly coupled with the inlet port 14 and/or the outlet port 16. Although one inlet port 14 and one outlet port 16 are illustrated herein, the inlet port 14 and/or the outlet port may comprise a plurality of inlet ports and/or a plurality of outlet ports without departing from the scope of the invention. The inlet port 14 and/or the outlet port 16 may comprise or be fluidly coupled with one or more manifold ports configured for connection to a plurality of fluid passages or hydraulic devices upstream or downstream of the unclamp delay valve 10.

The housing 12 may have a plurality of channels, passageways, or the like formed therein for selectively fluidly coupling the inlet port 14, the outlet port 16, and/or the piston chamber 18. For example, the inlet port 14 may be fluidly coupled with a first fluid passageway 28, and the first fluid passageway 28 may be fluidly coupled with a second fluid passageway 30 extending to and/or fluidly coupled with the outlet port 16, via the check valve 20 located therebetween. The first fluid passageway 28 may also be fluidly coupled with a third fluid passageway 32, and the third fluid passageway 32 may extend to and be fluidly coupled with the piston chamber 18. The flow control device 24 may control hydraulic fluid flow between the first fluid passageway 28 and the third fluid passageway 32. However, note that any of the fluid passageways 28-32 described herein may be omitted, such that the inlet port 14, outlet port 16, and/or piston chamber 18 are directly fluidly coupled with each other, as described herein, without departing from the scope of the invention.

In some embodiments of the invention, the housing 12 may further comprise and/or be coupled with one or more filters 34 located in the inlet port 14 and/or the outlet port 16 to filter out contaminants and the like from the hydraulic fluid passing therethrough, thereby protecting seals and other components therein from contaminants. The filters 34 may be removable, serviceable, and/or replaceable.

Figure 2:
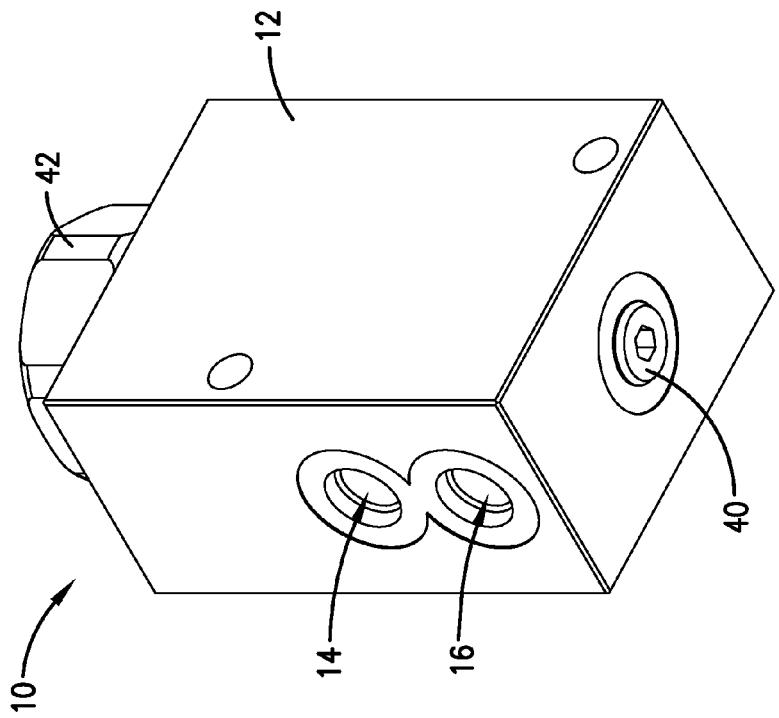
FIG. 2 is a bottom perspective view of the unclamp delay valve of FIG. 1.
Figure 1:
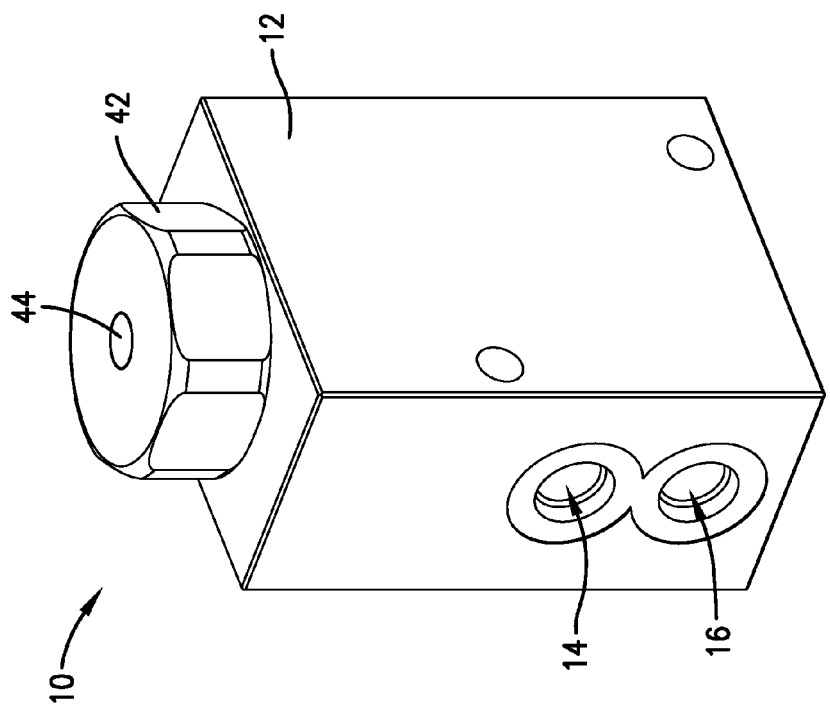
FIG. 1 is a top perspective view of an unclamp delay valve constructed according to embodiments of the present invention.
Figure 3:
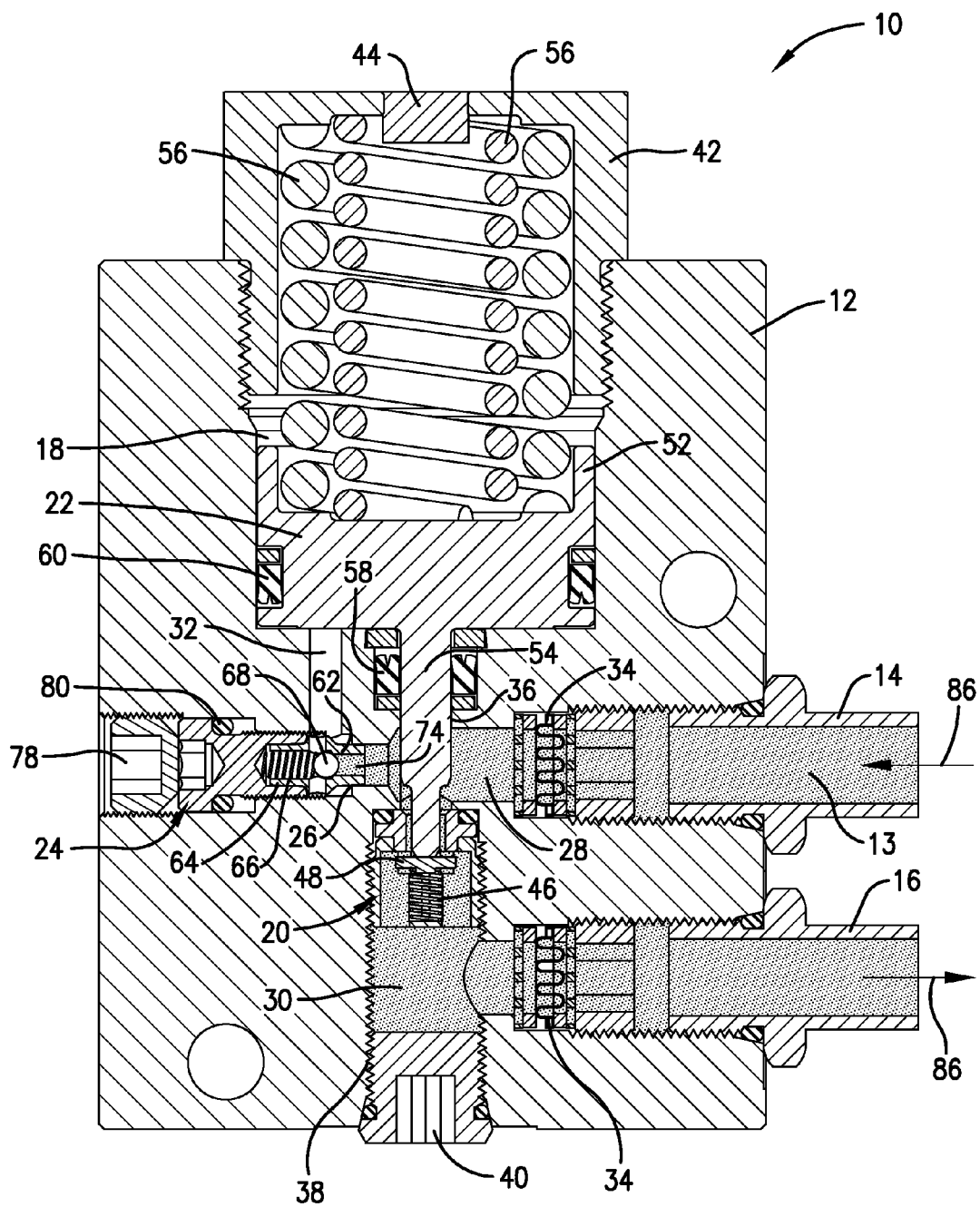
FIG. 3 is a cross-sectional elevation view of the unclamp delay valve of FIG. 1 with fluid flowing in a first flow direction, with a check valve thereof actuated open by a piston and a flow control valve closed.

In some embodiments of the invention, the housing 12 may further have a rod bore 36 formed therethrough, such that a portion of the piston 22 extends therethrough from the piston chamber 18 to the check valve 20, as later described herein. The housing 12 may also comprise one or more additional outlet ports 38, as illustrated in FIGS. 2-3, which may be closed with a plug 40 when not in use. Note that any number of inlet ports 14 and outlet ports 16 may be provided in the housing 12 without departing from the scope of the invention.

In some embodiments of the invention, the housing may further comprise a stopping feature 42, which may be a protrusion, shoulder, or cap, as illustrated in FIGS. 3-12, which can be of integral, one-piece construction with the housing 12 or may be mechanically attached to the housing 12 within the piston chamber 18 and designed to shoulder or abut the piston 22, thereby controlling a maximum stroke length of the piston 22. The stopping feature 42 may also be axially adjustable to control a location of the stopping feature 42 within the piston chamber 18, thereby adjusting the maximum stroke length of the piston 22 as desired. In some embodiments of the invention, the stopping feature 42 may comprise a cap with a vent port 44 formed therethrough and configured to allow an intake or exhaust, via piston movement, to atmosphere outward of the piston chamber 18. However, in some alternative embodiments of the invention, the vent port 44 may alternatively be located through the housing 12.

The check valve 20 may be any valve that is normally closed and is opened under hydraulic flow/pressure and/or mechanical force via the piston 22. For example, the check valve 20 may include any type of check valve, clack valve, non-return valve, one-way valve, poppet valve, or any other valve known in the art. The check valve 20 may be located between the inlet port 14 and the outlet port 16 and may be actuatable between an open configuration, allowing fluid to flow therethrough, as in FIGS. 3-7, and a closed configuration, as in FIGS. 8-11, blocking fluid from flowing therethrough. The check valve 20 may be held in the open configuration by the piston 22 and may be naturally biased in the closed configuration when not otherwise mechanically or hydraulically acted upon.

In some embodiments of the invention, the check valve 20 may include a first spring 46 or other resilient member (e.g., gas spring, rubber spring, etc.) and a first flow-obstructing component 48. The first spring 46 naturally biases the first flow-obstructing component 48 to close off or otherwise block one or more of the fluid passageways 28,30 at a first point of constriction 50 located between the inlet port 14 and the outlet port 16. The first flow-obstructing component 48 may be a disk, ball, or any shaped component for blocking a flow at the first point of constriction 50. Specifically, the first flow-obstructing component 48 may mechanically or hydraulically compress the first spring 46 or resilient member away from the first point of constriction 50, thereby opening the check valve 20 and allowing hydraulic fluid to flow through the first point of constriction 50. Note that any fluid passageways 30 between the outlet port 16 and the check valve 20 may be referred to herein as being on an outlet port side, and fluid passageways 28 between the inlet port 14 and the check valve 20 may be referred to herein as being on an inlet port side thereof.

Figure 4:
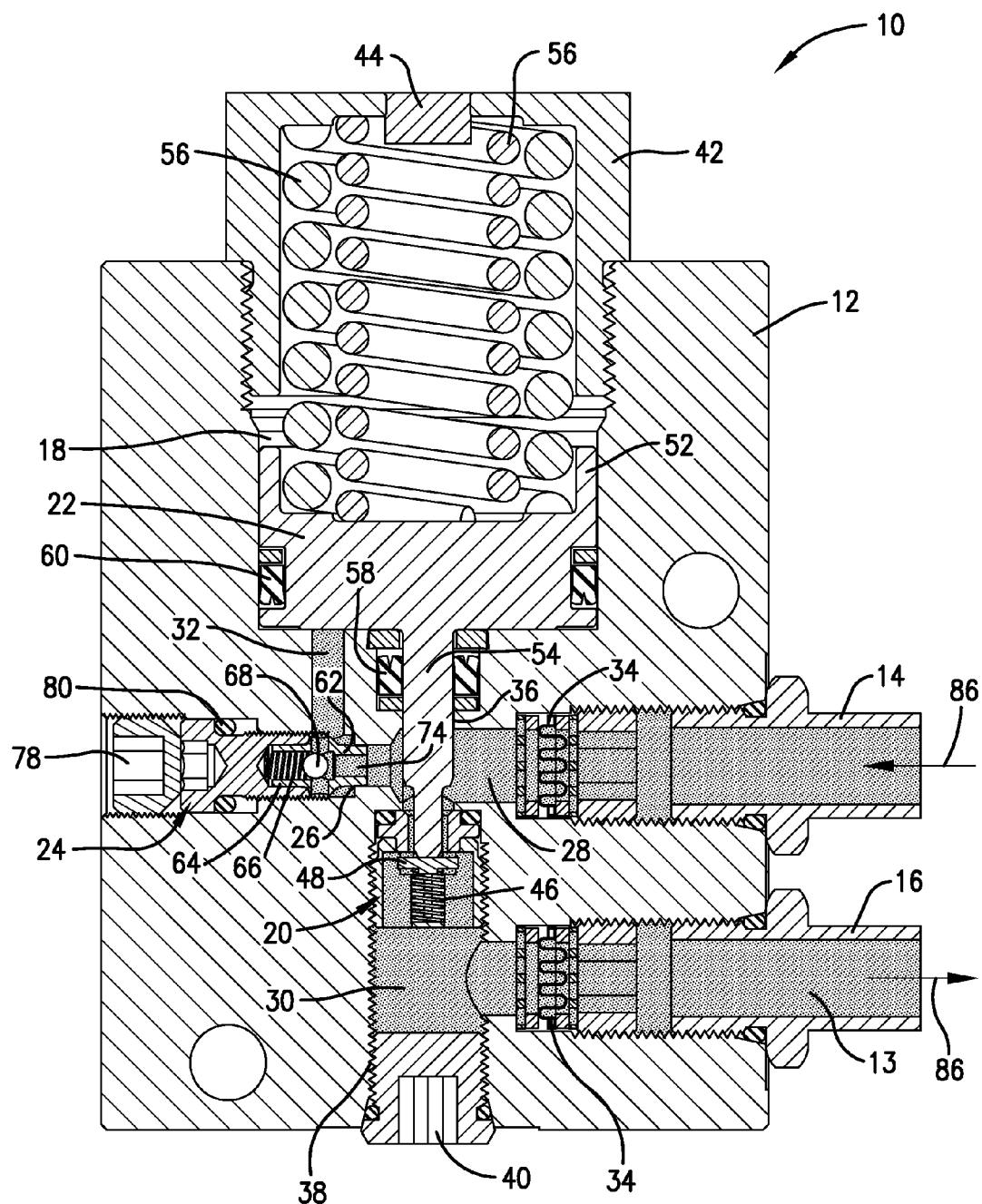
FIG. 4 is a cross-sectional elevation view of the unclamp delay valve of FIG. 3, with the flow control valve opening and beginning to allow fluid to flow toward a piston chamber.

The piston 22 may be any piston known in the art that is axially translatable within the piston chamber 18. The piston 22 may comprise a primary portion 52 located within the piston chamber 18 and a rod portion 54 that extends through the rod bore 36 into the first fluid passageway 28 and/or the second fluid passageway 30. The primary portion 52 and the rod portion 54 may be separate components mechanically coupled or may be of one-piece construction integrally formed with each other. Specifically, the rod portion 54 is configured to engage and hold the check valve 20 in the open configuration when the piston 22 is in a first stroke position, as illustrated in FIGS. 3, 4, and 12, and releases the check valve 20 to the closed configuration when the piston 22 is hydraulically translated to a second stroke position via hydraulic fluid filling at least a portion of the piston chamber 18, as illustrated in FIGS. 5-10. In some embodiments of the invention, the piston 22 may further comprise one or more piston-biasing springs 56 or other resilient members (e.g., gas spring, rubber spring, etc.) configured for naturally biasing the piston 22 in the first stroke position. Two piston-biasing springs 56 are illustrated in FIGS. 3-12 for providing sufficient force to the piston 22 in the direction toward the check valve 20. However, any quantity of springs or any types of resilient members may replace the springs illustrated in FIGS. 3-12 without departing from the scope of the invention described herein.

In some embodiments of the invention, the unclamp delay valve 10 may further comprise a first piston seal 58 which may be located between the rod portion 54 and the rod bore 36, thereby preventing hydraulic fluid from leaking out of the piston chamber 18 through the rod bore 36. The first piston seal 58 may comprise, for example, an O-ring and/or a back-up ring or other such hydraulic seals which provide hydraulic sealing without prohibiting movement of adjacent components, such as the rod portion 54 of the piston 22. The unclamp delay valve 10 may also comprise a second piston seal 60 which may be located between the primary portion 52 and the piston chamber 18 to also prevent hydraulic fluid from leaking out of the piston chamber 18 through any spaces between the primary portion 52 of the piston 22 and the housing 12.

Figure 5:
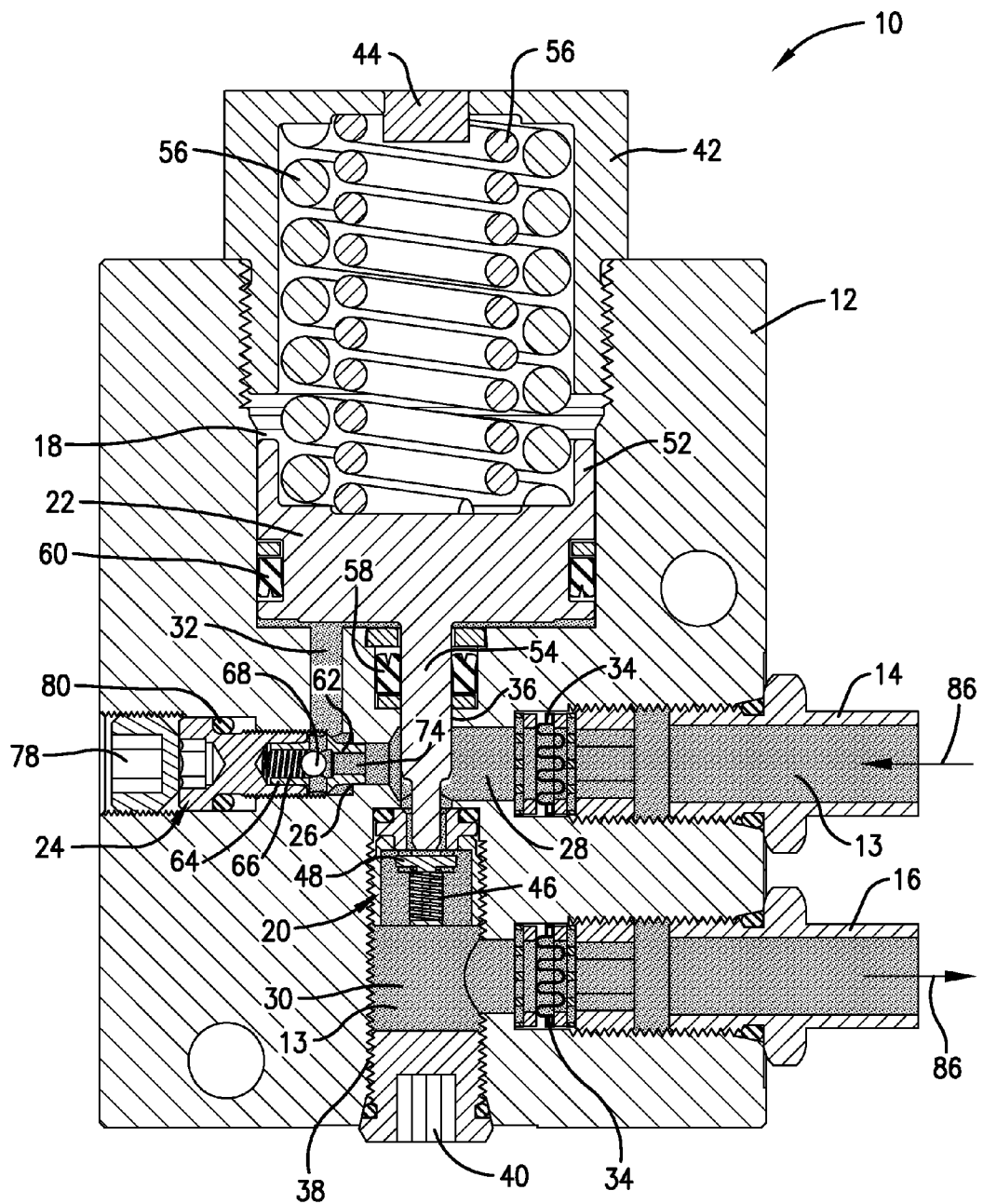
FIG. 5 is a cross-sectional elevation view of the unclamp delay valve of FIG. 4, with the piston beginning to move away from the check valve with fluid flowing into the piston chamber.
Figure 6:
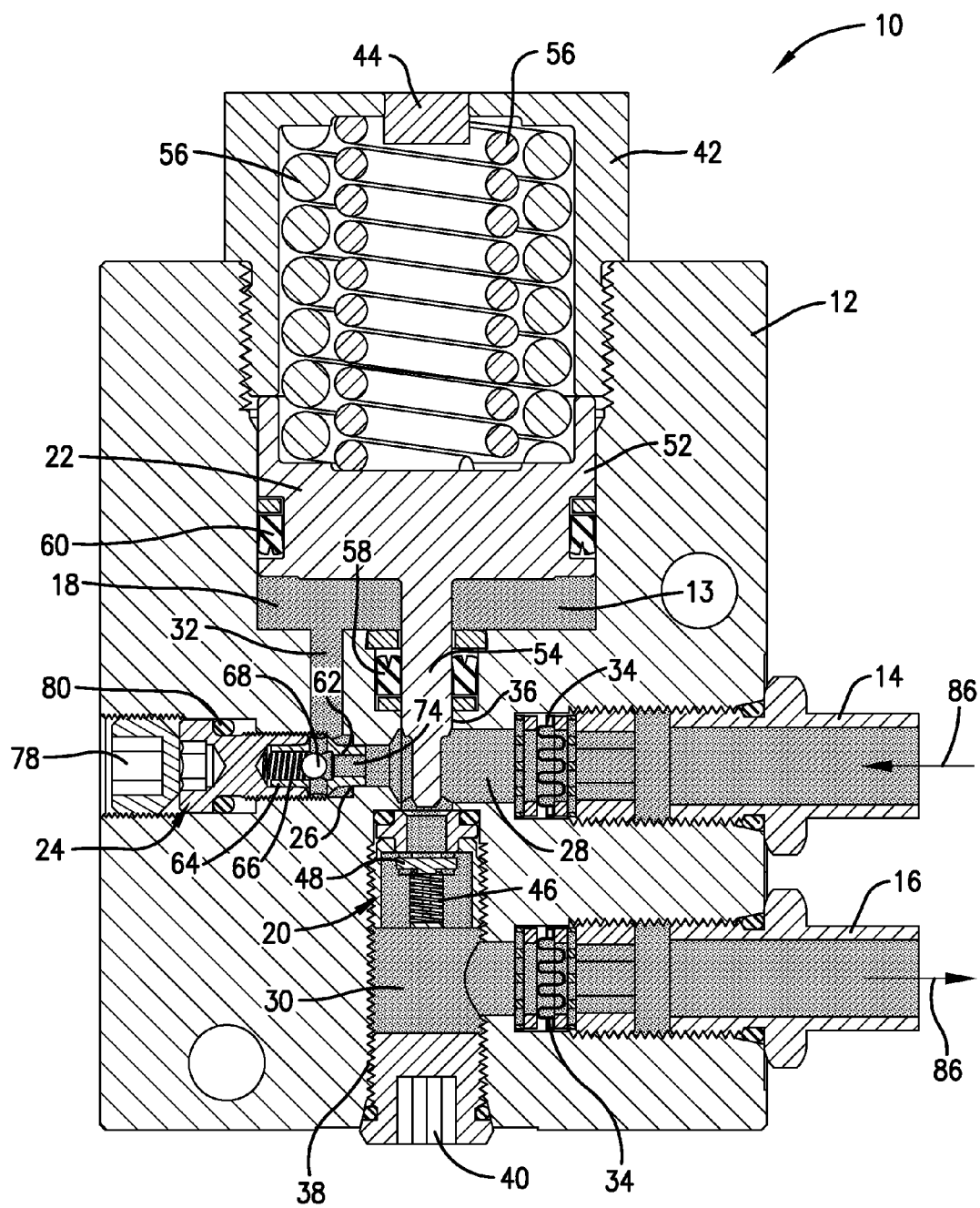
FIG. 6 is a cross-sectional elevation view of the unclamp delay valve of FIG. 5, illustrating the piston reaching a maximum stroke length, shouldered against a stopping feature.

The flow control device 24 may be configured for controlling flow of hydraulic fluid between the inlet port 14 and the piston chamber 18. The flow control device 24 may include a flow control valve 62 and a flow control body 64. The flow control valve 62 may include any type of check valve, clack valve, non-return valve, one-way valve, poppet valve, or any other valve known in the art, and may be actuatable between a closed state and an opened state. In some embodiments of the invention, the flow control valve 62 may include a second spring 66 or other resilient member (e.g., gas spring, rubber spring, etc.) and a second flow-obstructing component 68, wherein the second spring 66 naturally biases the second flow-obstructing component 68 to close off or otherwise block one or more of the fluid passageways 28,32 at a second point of constriction 70 located between the inlet port 14 and the piston chamber 18 or the first fluid passageway 28 and the third fluid passageway 32. The second flow-obstructing component 68 may be a disk, ball, or any shaped component for blocking a flow at the second point of constriction 70. The second flow-obstructing component 68 may be configured to hydraulically compress the second spring 66 or resilient member away from the second point of constriction 70, thereby opening the flow control valve 62 and allowing hydraulic fluid to flow through the second point of constriction 70, as illustrated in FIGS. 4-6.

Figure 5A:
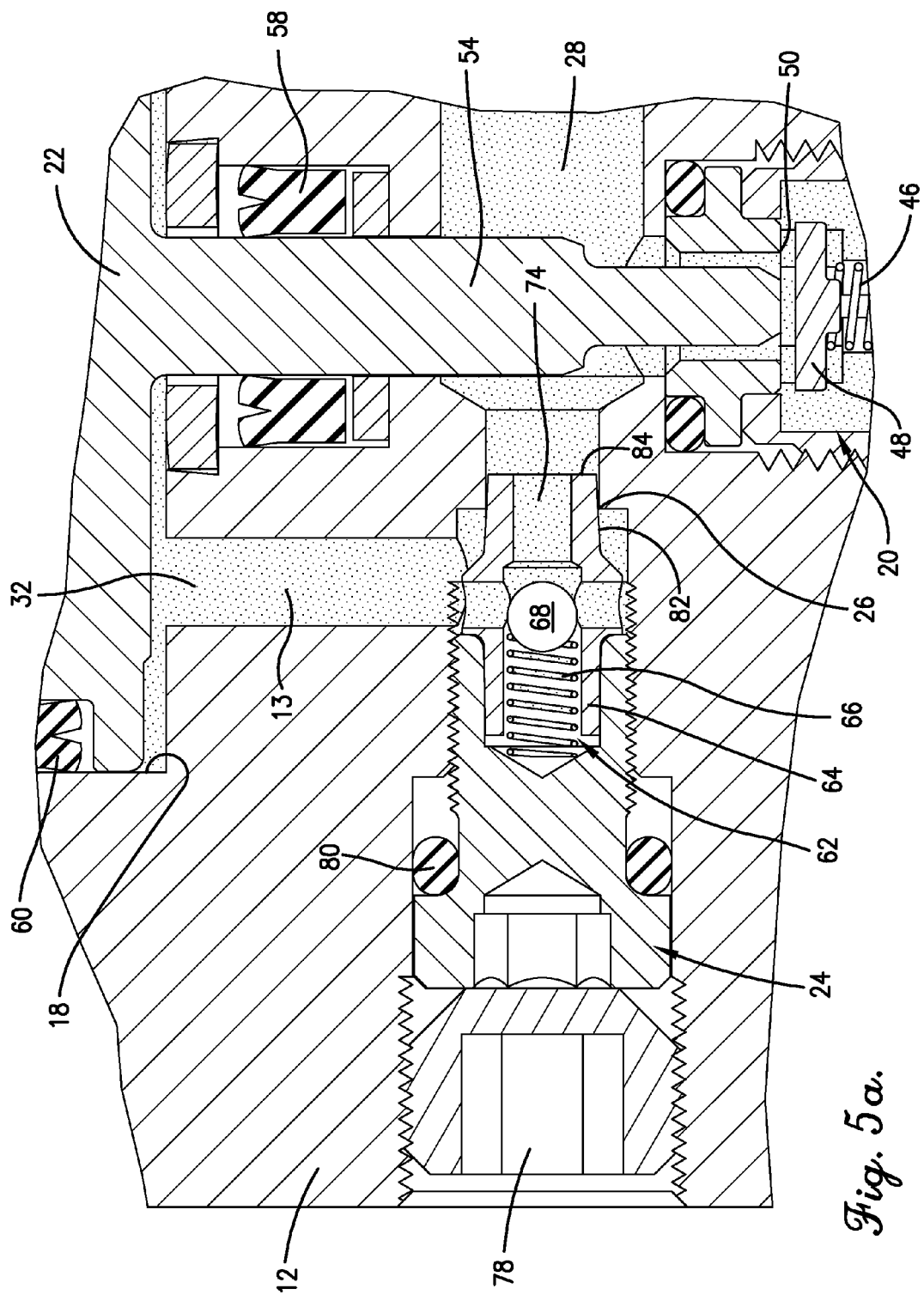
FIG. 5a is an enlarged cross-sectional elevation view of a flow control device of FIG. 5.
Figure 5B:
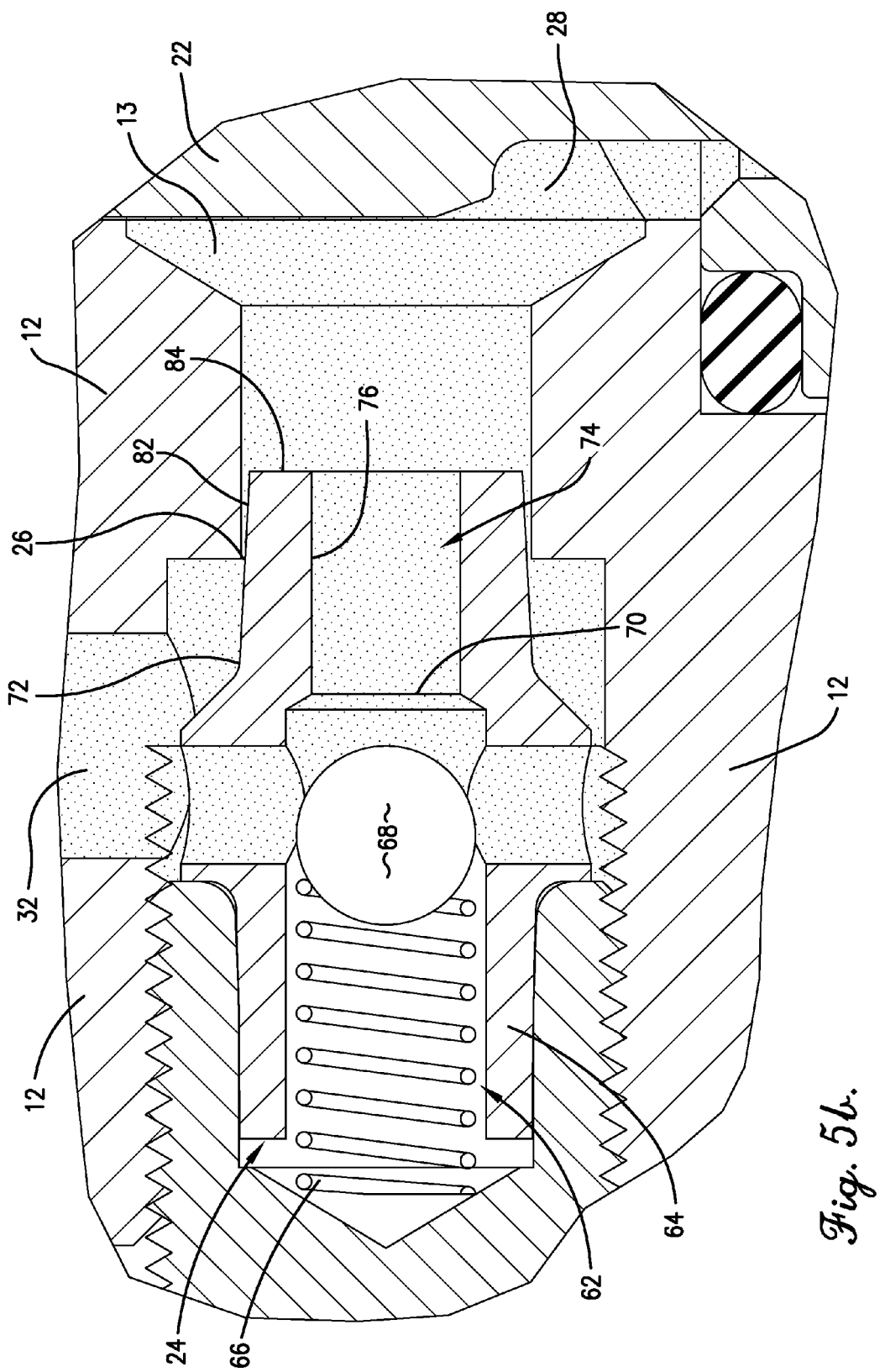

As best illustrated in FIGS. 5a and 5b, the flow control body 64 may have an outer surface 72 and a flow control passageway 74 formed therethrough having an inner surface 76. The flow control body 64 may be integral to the housing 12 and/or fixed thereto via screw threads or the like. In some embodiments of the invention, the flow control body 64 may be actuatable within the housing 12 via screwing the flow control body 64 toward or away from the inlet port 14 and/or the first fluid passageway 28. In one example embodiment of the invention, an operator may remove a set screw 78, insert a hex key into a hex of the flow control body 64, make a positional adjustment thereto, then re-install the set screw 78, to lock the position of the flow control body 64. In some embodiments of the invention, a flow control body seal 80, such as an O-ring or the like, may be positioned between the outer surface 72 of the flow control body 64 and the housing 12, such that hydraulic fluid does not escape outward of the housing 12 between the housing 12 and the flow control body 64.

In some embodiments of the invention, the orifice 26 noted above may be formed between the outer surface 72 of the fluid control body 64 and the housing 12, as illustrated in FIGS. 5a and 5b, allowing small amounts of hydraulic fluid to pass therethrough. Note that although only one orifice 26 is described and illustrated in many of the embodiments described herein, the orifice 26 may comprise a plurality of openings formed through the flow control body 64, the housing 12, and/or a combination of the flow control body 64 and the housing 12 without departing from the scope of the invention. Preferably the orifice 26 is sized to be much smaller than the flow control passageway 74, such that the hydraulic fluid flows into the piston chamber 18 at a faster rate than the hydraulic fluid flows out of the piston chamber 18 via the orifice 26.

The orifice 26 may continuously fluidly couple the piston chamber 18 and the inlet port 14 and/or the first fluid passageway 28 and the third fluid passageway 32, regardless of whether the flow control valve 62 is in the open state or the closed state. Furthermore, the flow control body 64 may be sized and shaped to control the size of the orifice 26. For example, the outer surface 72 of the flow control body 64 may have a substantially tapered portion 82 at a leading edge 84 or end thereof, such that screwing the flow control body 64 further into the housing 12 decreases a size of the orifice 26 and screwing the flow control body 64 further out of the housing 12 in an opposite direction increases a size of the orifice 26. As noted above, the orifice 26 may be configured to control how quickly fluid flows out from the piston chamber 18 to the inlet port 14 when a hydraulic pressure drop occurs in the inlet port 14, as later described herein. This in turn controls the delay time for the piston's rod portion 54 to actuate the check valve 20 back into the open configuration, thus releasing the hydraulic fluid downstream of the outlet port 16, as later described herein. Other methods of adjusting the size of the orifice 26 may be used without departing from the scope of the invention. In one alternative embodiment of the invention, the flow control device 24 may be configured as a removable/replaceable cartridge that could be changed out with a different cartridge having a different size or shape to alternate orifice sizes.

In use, the unclamp delay valve 10 described herein may receive hydraulic fluid, such as oil, pumped into the inlet port 14, while the rod portion 54 of the piston 22 holds the check valve 20 in the open configuration, such that the hydraulic fluid can freely flow from the inlet port 14 to and through the outlet port 16 and to work supports or the like connected downstream of the outlet port 16. The hydraulic pressure builds within the unclamp delay valve 10 until it is sufficient to actuate the flow control valve 62 to open its open state, thereby allowing the hydraulic fluid to flow from the inlet port 14 to the piston chamber 18. As fluid fills the piston chamber 18, the primary portion 52 of the piston 22 is pressed toward the stopping feature 42, moving the rod portion 54 away from the check valve 20.

The check valve 20 may still remain open while flow continues between the inlet port 14 and the outlet port 16. However, once the outlet port 16 and/or hydraulic components downstream of the outlet port 16 are completely filled with hydraulic fluid, such that no other hydraulic fluid can be added thereto (i.e., system pressure is reached), flow through the check valve stops and the check valve 20, no longer held open by hydraulic pressure or the mechanical force of the rod portion 54, returns to its naturally-biased closed configuration.

Likewise, when the piston 22 shoulders against the stopping feature 42, and no further fluid can be added to the piston chamber 18 between the primary portion 52 and the flow control valve 62, flow between the inlet port 14 and the piston chamber 18 stops and thus is no longer actuating the flow control valve 62 into the open state. Therefore, the flow control valve 62 returns to its naturally-biased closed state. Once system pressure is reached at the inlet port 14, this hydraulic pressure in the first fluid passageway 28 and/or the inlet port 14 may prevent fluid from leaking out of the piston chamber 18 through the orifice 26. While system pressure is held throughout the unclamp delay valve 10, downstream components such as a hydraulic holding device may maintain holding force on a part or work piece being machined. Once this machining cycle is complete, unclamping of the hydraulic holding device may be desired.

Once unclamping is desired downstream of the outlet port 16, the hydraulic fluid may begin to be released through the inlet port 14, thus reducing hydraulic pressure in the first fluid passageway 28 and/or the inlet port 14. The hydraulic fluid in the piston chamber 18 is then able to slowly seep out of the orifice 26 and out through the inlet port 14. The piston-biasing spring(s) 56 may also aid in pushing the hydraulic fluid out of the piston chamber 18. This release of hydraulic fluid through the orifice 26 allows the piston 22 to return to its naturally-biased position, pressing against the check valve 20 and holding it open. Once the check valve 20 is reopened by the rod portion 54, fluid from the outlet side of the check valve 20 and any fluid downstream of the check valve 20 may then flow out through the second fluid passageway 30, the first fluid passageway 28, and/or the inlet port 14. This may, for example, release hydraulic pressure from a downstream clamp or work support after a selected delay time. As noted herein, the delay time may be adjusted by adjusting a size of the orifice 26, adjusting a stroke length of the piston 22, and/or selecting a hydraulic fluid with a different viscosity.

Method steps for providing instantaneous hydraulic flow in a first flow direction and then delayed hydraulic flow in an opposite second flow direction through the unclamp delay valve 10 will now be described in more detail, in accordance with various embodiments of the present invention. The steps of the method 1300 may be performed in the order as shown in FIG. 13, or they may be performed in a different order. Furthermore, some steps may be performed concurrently as opposed to sequentially. In addition, some steps may not be performed.

As illustrated in FIG. 13, the method 1300 may include a step of receiving with the inlet port 14 a flow of hydraulic fluid flowing in a first flow direction 86 toward and through the outlet port 16, as depicted in block 1302. This may be accomplished by pumping or otherwise releasing a flow of hydraulic fluid, such as oil, into the inlet port 14 of the unclamp delay valve 10, as illustrated in FIG. 3. In some embodiments of the invention, the directional control valve (not shown) upstream of the inlet port 14 may be shifted to provide hydraulic fluid flow and pressure in the first flow direction 86 through the inlet port 14.

The method 1300 may also include a step of holding open the check valve 20 with the rod portion 54 of the piston, as depicted in block 1304. As earlier noted herein, the piston 22 may be biased to normally contact and hold open the check valve 20, while the check valve 20 may be biased to normally close when released by the rod portion 54 of the piston 22, unless otherwise acted upon by hydraulic pressure sufficient to open the check valve 20 (e.g., a pressure drop on the outlet port side of the check valve 20 or a flow of hydraulic fluid from the inlet port 14 to the outlet port 16 holding the check valve 20 open). Thus, as illustrated in FIG. 3, a spring force shoulders the piston 22 against the first flow-obstructing component 48, holding the check valve 20 open.

The method 1300 may further comprise a step of hydraulically opening the flow control valve 62, as depicted in block 1306, such that hydraulic fluid continues to flow in the first flow direction 86 and into the piston chamber 18, thereby hydraulically translating the piston 22 in the piston chamber 18 in a direction away from the check valve 20, as depicted in block 1308, such that the rod portion 54 disengages from the check valve 20. The flow control valve 62, as described above, is biased to be naturally closed, but may be opened by sufficient hydraulic pressure. For example, as illustrated in FIG. 4, flow from the inlet port may press open the flow control valve 62, such that the hydraulic fluid can then move into the piston chamber 18 and thus press the piston 22 in a direction away from the check valve 20. In some embodiments of the invention, a pressure of approximately 200-300 PSI may be sufficient to begin moving the piston 22 in a direction away from the check valve 20 and to compress the piston-biasing springs 56, as illustrated in FIG. 5, and a pressure of approximately 350 PSI may be sufficient to shoulder the piston 22 against the stopping feature 42, as illustrated in FIG. 6. However, other amounts of pressure may be used and/or required without departing from the scope of the invention.

Figure 7:
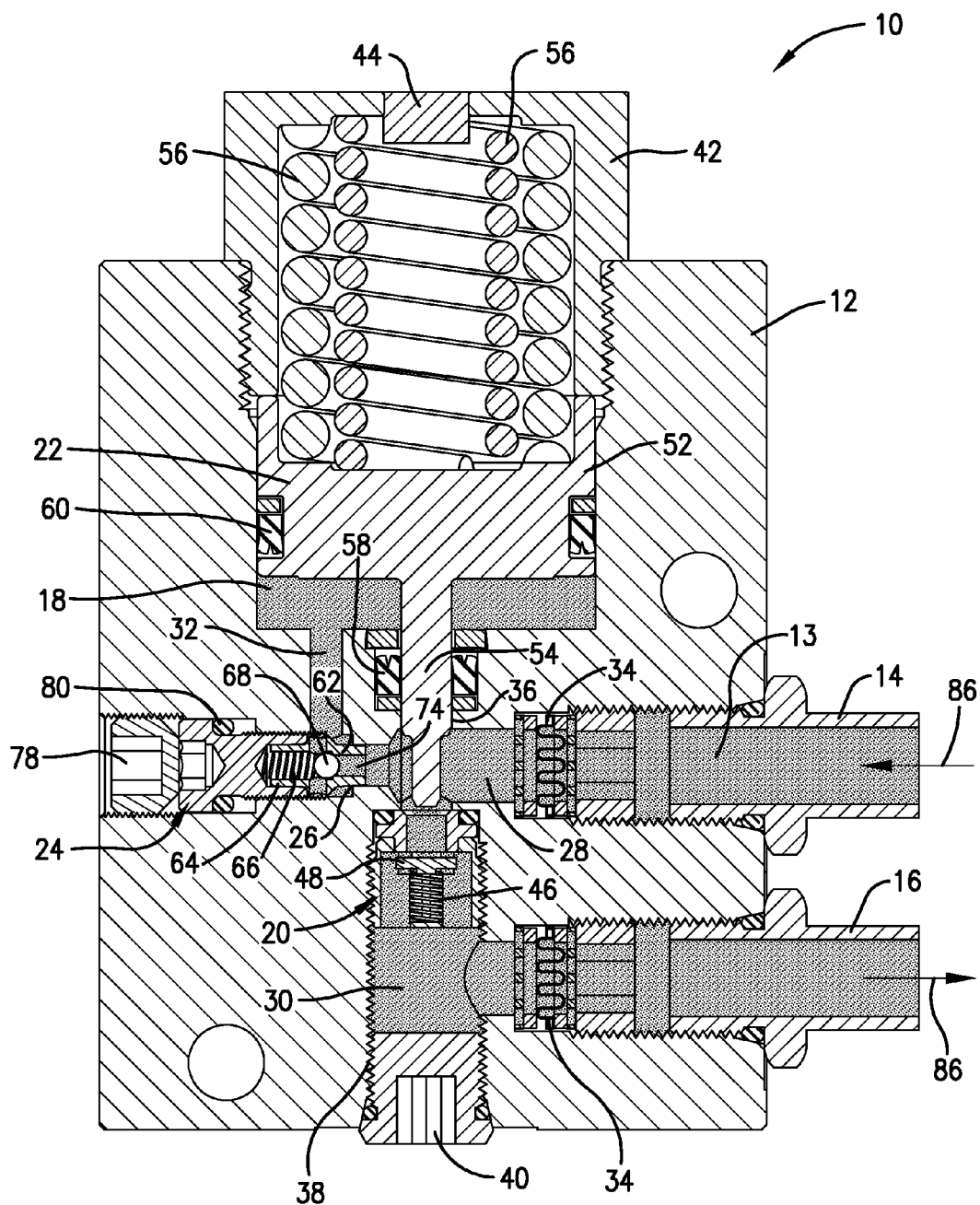
FIG. 7 is a cross-sectional elevation view of the unclamp delay valve of FIG. 6, illustrating the flow control valve closed once system pressure is reached in the piston chamber.

The method 1300 may also include a step of closing the flow control valve 62, as depicted in block 1310 and illustrated in FIG. 7, such that hydraulic fluid stops flowing from the inlet port 14 to the piston chamber 18. Specifically, the flow control valve 62 may be naturally biased to return to its closed position when the piston 22 reaches its maximum stroke length and the piston chamber 18 is full of hydraulic fluid between the primary portion 52 and the flow control valve 62, such that no more hydraulic fluid can flow thereto. Thus, when hydraulic pressure is sufficient to stop the flow therethrough, the flow control valve 62 closes.

Figure 8:
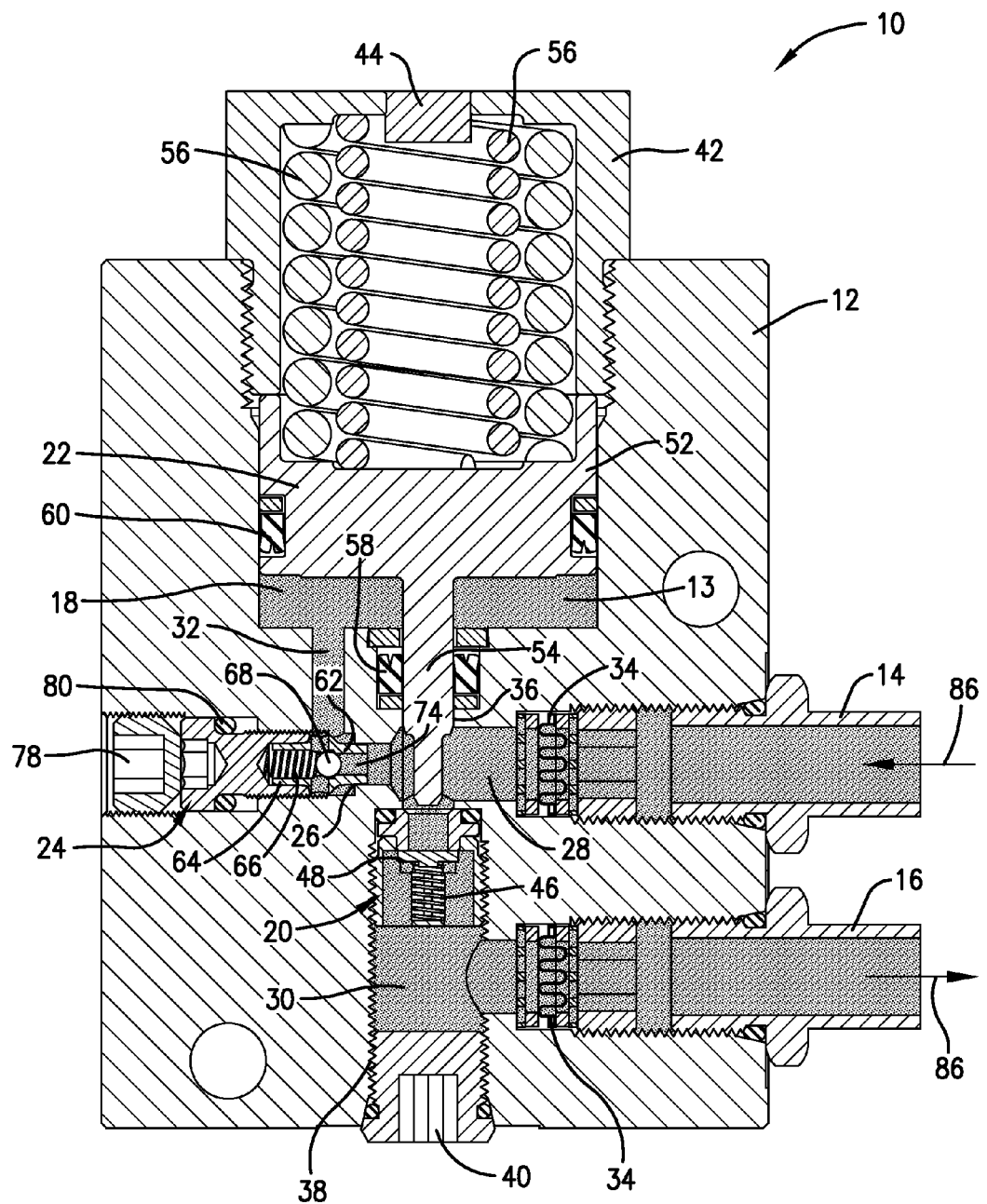
FIG. 8 is a cross-sectional elevation view of the unclamp delay valve of FIG. 7, illustrating the check valve closed once system pressure is reached downstream of the check valve and the piston is shouldered against the stopping feature.
Figure 9:
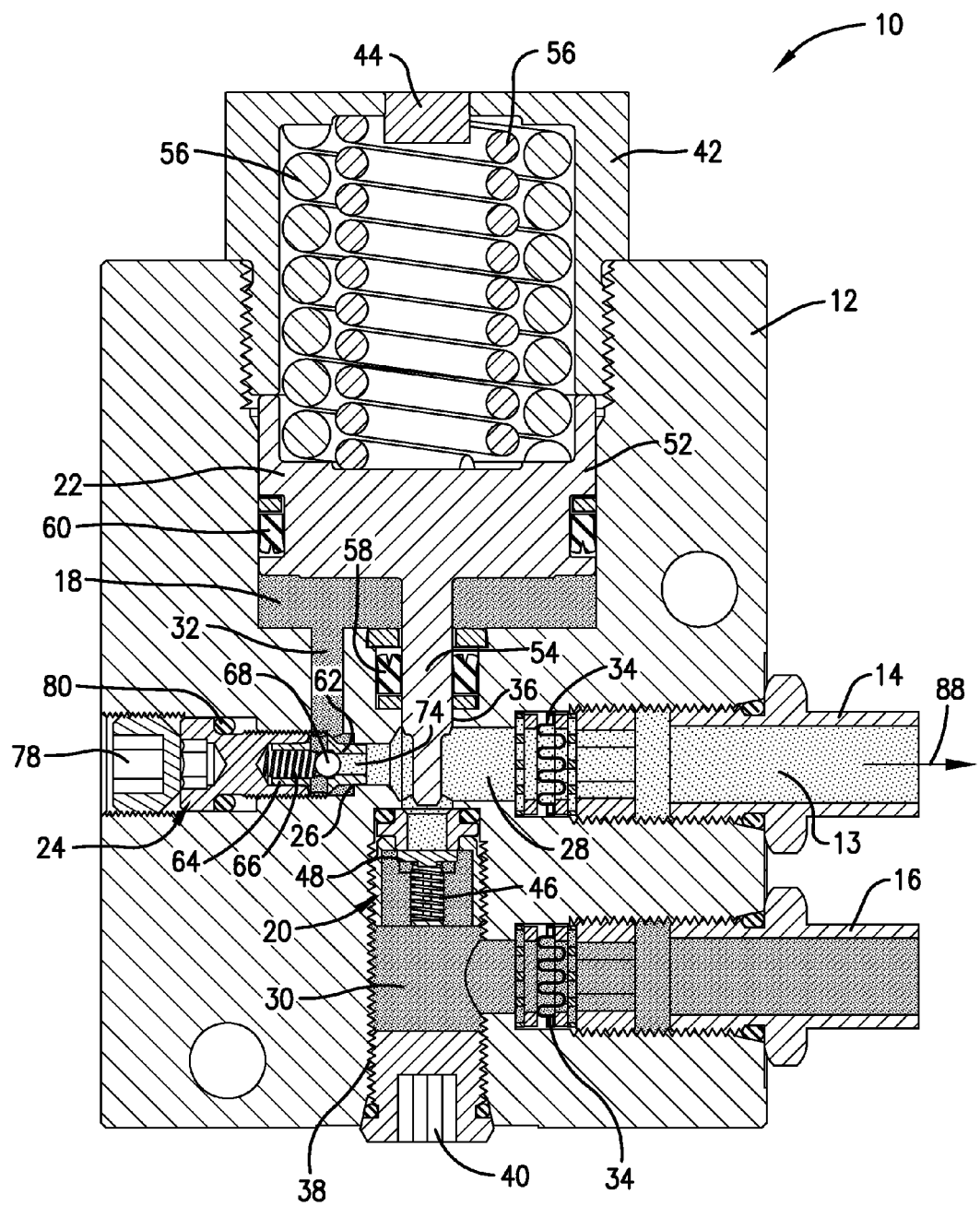
FIG. 9 is a cross-sectional elevation view of the unclamp delay valve of FIG. 8, illustrating fluid flowing in a second flow direction, outward through the inlet port.

The method 1300 then includes a step of closing the check valve 20, as depicted in block 1312 and illustrated in FIG. 8, such that the hydraulic fluid cannot flow between the inlet port 14 and the outlet port 16. This closing may occur as a response to the rod portion 54 disengaging from the check valve 20 and a maximum hydraulic pressure being achieved downstream of the check valve 20, such that no more flow may be provided therethrough. Furthermore, closing of the check valve 20 may occur if the rod portion 54 has disengaged from the check valve 20 and no additional flow is being provided to the check valve 20 from the inlet port 14 or the piston chamber 18/orifices 26 (i.e., when system pressure in the unclamp delay valve 10 is reached).

With both the flow control valve 62 and the check valve 20 closed, hydraulic components downstream of the outlet port 16 may maintain a desired hydraulic pressure. If slight or momentary loss of hydraulic pressure downstream of the outlet port 16 is experienced, the pressure differential between the inlet port side and the outlet port side of the check valve 20 may cause the check valve 20 to hydraulically open until a balanced hydraulic pressure is again achieved on both sides of the check valve 20. Specifically, hydraulic fluid may flow from the piston chamber 18 through the orifice 26 then through the check valve 20, restoring the desired hydraulic pressure downstream of the outlet port 16.

Figure 10:
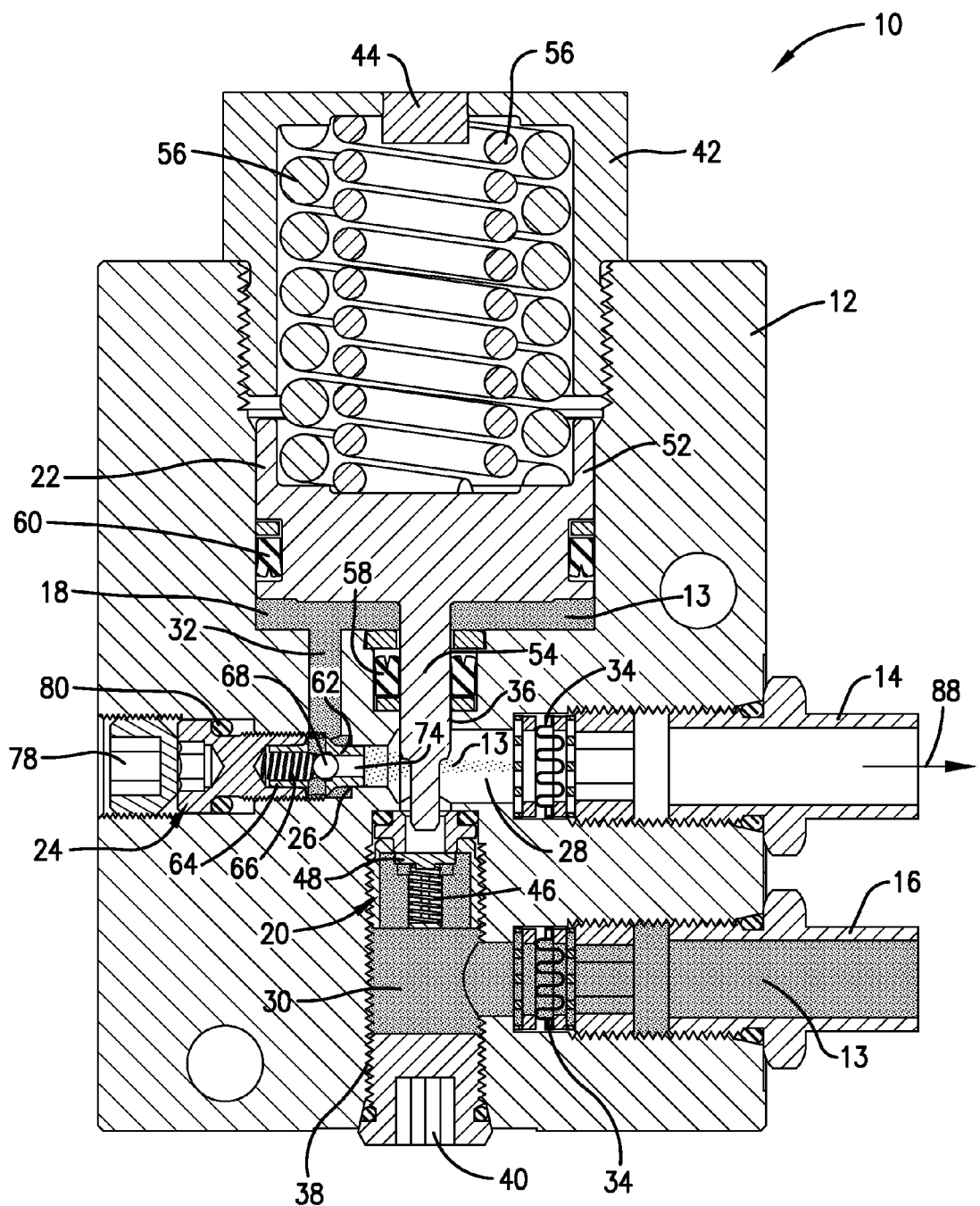
FIG. 10 is a cross-sectional elevation view of the unclamp delay valve of FIG. 9, illustrating fluid flowing out of the piston chamber through the orifice.
Figure 10A:
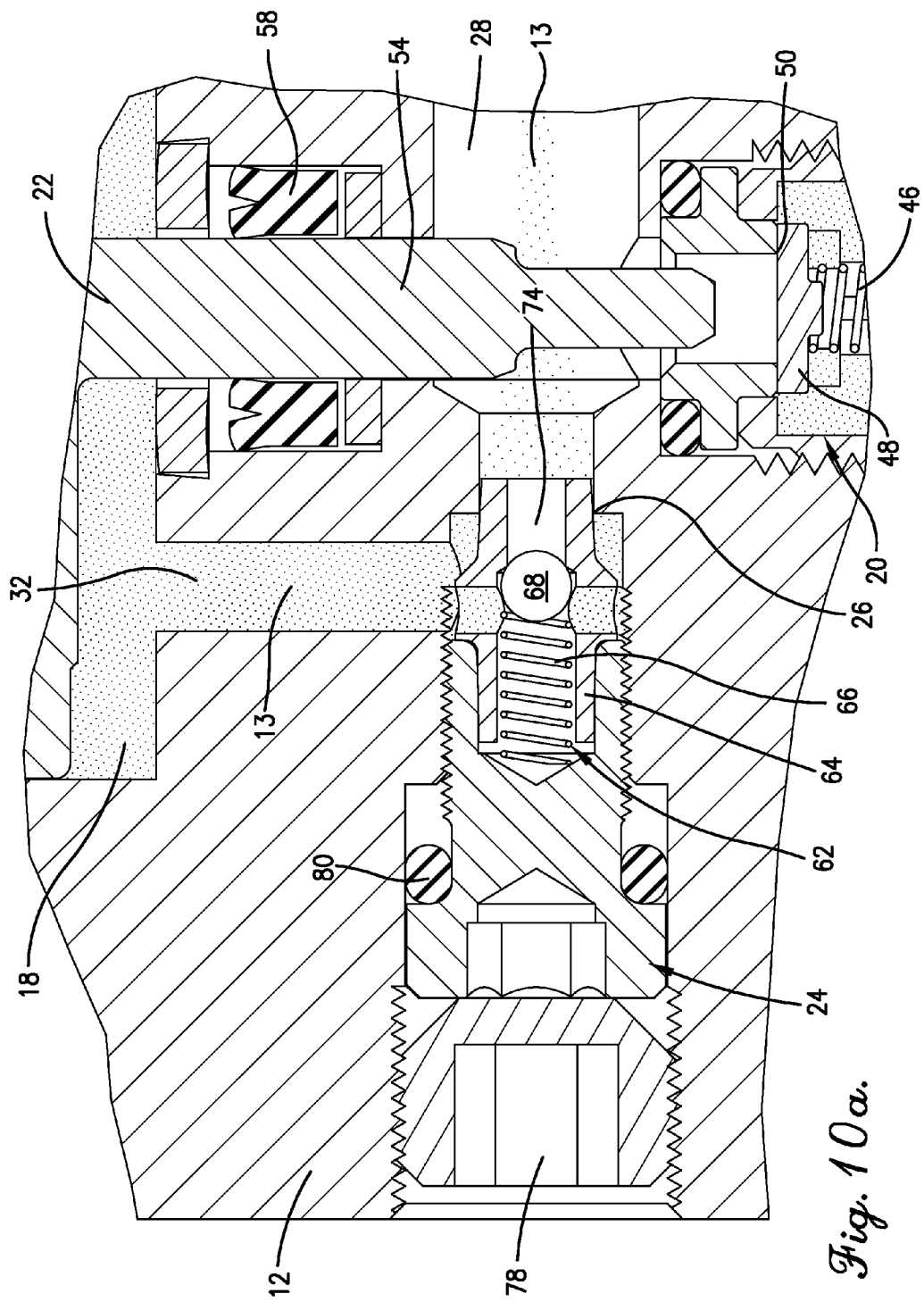
FIG. 10a is an enlarged cross-sectional elevation view of fluid flowing out of the piston chamber through the orifice.

When hydraulic pressure downstream of the outlet port 16 is desired to be completely released, the method 1300 may then include a step of releasing hydraulic fluid through the inlet port 14 in a second flow direction 88, opposite the first flow direction 86, as depicted in block 1314 and illustrated in FIGS. 9-12. This may be accomplished, for example, by shifting a directional control valve (not shown) upstream of the inlet port 14 to reverse flow therethrough. As a result of step 1314, the method 1300 may further include a step of releasing hydraulic fluid from the piston chamber 18 into the inlet port 14 in the second flow direction 88 through the orifice 26, as depicted in block 1316 and FIGS. 10 and 10a. The orifice 26, as described above, fluidly couples the piston chamber 18 and the inlet port 14 even while the flow control valve 62 remains closed.

Because the orifice 26 is designed and/or adjusted to be relatively small compared to the other ports and valve openings of the unclamp delay valve 10, the release of hydraulic fluid therethrough is slower than the filling of the piston chamber 18 through the flow control valve 62. The amount of time between when hydraulic pressure begins to be released from the inlet port 14 and when the check valve 20 is opened may be referred to herein as a delay time. Because this reopening of the check valve 20 is accomplished by hydraulic fluid release from the piston chamber 18 via the orifice 26 allowing the rod portion 54 of the piston to move back in contact with the check valve 20, this delay time may be proportional to at least one of the size of the orifice, a stroke length of the piston, and a viscosity of the hydraulic fluid.

The method 1300 may also include a step of hydraulically translating the piston 22 in the piston chamber 18 in a direction toward the check valve 20, as depicted in block 1318, thus opening the check valve 20, after the delay time, via mechanical force by the rod portion 54 of the piston 22, as depicted in block 1320 and depicted in FIGS. 11 and 12, thereby releasing hydraulic fluid from the outlet port 16 in the second flow direction 88 toward the inlet port 14. Specifically, release of the hydraulic fluid from the piston chamber 18 through the orifice 26 allows the piston to return to its naturally biased position, such that the rod portion 54 thereof engages the check valve 20, thus opening the check valve 20 so that hydraulic fluid downstream of the outlet port 16 can be released through the check valve 20 and then through the inlet port 14. The fluid released through the inlet port 14 may then be returned back to a hydraulic pump reservoir or anywhere desired for disposal or reuse.

In some embodiments of the invention, the method 1300 may include the steps of adjusting a size of the orifice 26, as depicted in block 1322, and adjusting a stroke length of the piston 22, as depicted in block 1324. As described above, the delay time may be proportional to at least one of the size of the orifice 26, a stroke length of the piston 22, and a viscosity of the hydraulic fluid. Thus, adjusting the size of the orifice 26 and/or the stroke length of the piston 22 may be a way in which an operator can adjust the delay time of the unclamp delay valve 10. Specifically, the orifice 26 may be increased in size or decreased in size based on the location of the flow control device 24 within the housing 12. For example, interfacing screw threads may mechanically attach the flow control device 24 within the housing 12, so that the flow control device 24 can be screwed further into the housing 12 to decrease the size of the orifice 26, or conversely screwed outward to retract portions of the flow control device 24 away from an inner surface or edge within the housing 12, thus increasing the size of the orifice. The delay time may be adjustable from a theoretical zero to infinity, but in many field applications, the delay time may be set, for example, to a 5 second delay time. However, other delay times may be provided without departing from the scope of the invention.

Likewise, the stroke length of the piston 22 may be changed based on a maximum amount of compression allowed by piston-biasing springs 56 and/or a location within the piston chamber 18 of the stopping feature 42 within the piston chamber 18. For example, similar to the flow control device 24, the stopping feature 42 may be screwed further into or screwed further out of the piston chamber 18, thus changing the stroke length allowed before the piston cannot be pressed any further in the direction away from the check valve 20.

Advantageously, the method 1300 and the unclamp delay valve 10 described herein provides a time delay to unclamping devices, such as hydraulic holding devices, downstream (e.g., fluidly coupled to the outlet port 16). The unclamp delay valve 10 can therefore be used to temporarily keep a work support locked during an unclamping cycle, allowing time for a single acting device clamping over the top of the work support to retract and release all of its clamping forces before the work support under the part unclamps. The unclamp delay valve 10 may also be used to provide unclamp sequencing to any single-acting hydraulic device connected downstream of the unclamp delay valve 10. For example, the time delay provided by the unclamp delay valve 10 may allow temporary holding of a part or work piece against hard stops while all other clamping devices are retracting out of the way to allow time for a robot or operator to contact and grip the part or work piece in preparation for removal. The unclamp delay valve 10 may also be used in conjunction with a sequence valve by manifold mounting under the sequence valve to provide sequencing during clamping and unclamping. Assuming the viscosity of the hydraulic fluid used is consistent throughout service life of the unclamp delay valve 10, the time delay may be consistent and repeatable once set and locked to a desired delay, as described above.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A delay valve configured for delaying release of hydraulic pressure in a hydraulic holding device, the delay valve comprising:
a housing forming an inlet port, an outlet port, and a piston chamber, wherein the inlet port is selectively fluidly coupled with the piston chamber, and the inlet port is selectively fluidly coupled with the outlet port;
a check valve located between the inlet port and the outlet port, wherein the check valve is actuatable between an open configuration allowing fluid to flow therethrough and a closed configuration blocking fluid from flowing therethrough;
a piston translatable within the piston chamber, the piston having a rod portion that engages and holds the check valve in the open configuration when the piston is in a first stroke position and releases the check valve to the closed configuration when the piston is hydraulically translated to a second stroke position via hydraulic fluid filling at least a portion of the piston chamber; and
a flow control device operable to control flow of hydraulic fluid between the inlet port and the piston chamber, wherein the flow control device is integral to or mechanically attached within the housing, wherein at least one of the fluid control device and the housing presents an orifice that continuously fluidly couples the piston chamber and the inlet port, wherein a size of the orifice controls how quickly fluid flows out from the piston chamber to the inlet port when a hydraulic pressure drop occurs in the inlet port, thereby creating a delay time between the hydraulic pressure drop in the inlet port and the piston hydraulically moving back to the first stroke position, such that the rod portion actuates the check valve back into the open configuration.

2. The delay valve of claim 1, wherein the check valve is also actuatable into the open configuration by hydraulic pressure alone.

3. The delay valve of claim 1, wherein the flow control device further comprises a flow control valve configured to actuate between a normally closed state and an hydraulically opened state, wherein the flow control valve comprises a resilient closing device naturally-biased in the closed state and configured to be compressed into the open state by hydraulic fluid passing from the inlet port to the piston chamber, but to remain closed when hydraulic fluid flows from the piston chamber through the orifice toward the inlet port.

4. The delay valve of claim 1, wherein the housing further comprises a selectively adjustable protrusion or ledge configured for shouldering the piston at the second stroke position, wherein the second stroke position is adjustable by adjusting a location of the protrusion or ledge within the piston chamber.

5. The delay valve of claim 1, wherein the size of the orifice is adjustable, thereby adjusting the delay time.

6. The delay valve of claim 1, wherein the inlet port and the outlet port are configured for connecting to external feed lines.

7. The delay valve of claim 1, wherein at least one of the inlet port and the outlet port comprises or is fluidly coupled with at least one manifold port configured for connection to a plurality of fluid passages or hydraulic devices.

8. The delay valve of claim 1, wherein the housing has a rod bore formed therethrough and the rod portion of the piston extends through the rod bore, wherein a piston seal is located between the rod portion and the rod bore, thereby preventing hydraulic fluid from leaking out of the piston chamber through the rod bore.

9. The delay valve of claim 1, wherein at least one of the check valve and the flow control device comprises a poppet valve that is normally closed and opened under at least one of hydraulic flow and mechanical force via the rod portion.

10. The delay valve of claim 1, further comprising one or more filters in at least one of the inlet port and the outlet port.

11. The delay valve of claim 1, wherein the housing is a block-type manifold housing or a cartridge-type housing.

12. A delay valve configured for delaying release of hydraulic pressure in a hydraulic holding device, the delay valve comprising:
a housing forming an inlet port, an outlet port, and a piston chamber, wherein the inlet port is selectively fluidly coupled with the piston chamber, and the inlet port is selectively fluidly coupled with the outlet port;
a check valve located between the inlet port and the outlet port, wherein the check valve is actuatable between an open configuration allowing fluid to flow therethrough and a closed configuration blocking fluid from flowing therethrough;
a piston translatable within the piston chamber, the piston having a rod portion translatable toward and away from the check valve, wherein the rod portion is configured to hold the check valve in the open configuration when the piston is in a first stroke position and to release the check valve to the closed configuration when the piston is in a second stroke position, wherein the piston translates from the first stroke position to the second stroke position via hydraulic pressure when hydraulic fluid flows from the first inlet port to the piston chamber, thereby pressing the piston to translate in a direction away from the check valve; and a flow control device provided between the inlet port and the piston chamber, the flow control device having an outer surface, a flow control passageway with an inner surface, and a flow control valve, wherein the flow control valve is configured to actuate between a naturally closed state in which fluid is blocked from passing through the flow control passageway and an open state achieved by force of hydraulic fluid flowing in through the inlet port, wherein a gap or orifice is provided between the outer surface of the flow control device and the housing, wherein a size of the gap or orifice is adjustable and controls how quickly fluid flows out from the piston chamber to the inlet port while the flow control valve is in a closed state and the hydraulic fluid is flowing out of the inlet port, thus controlling an amount of delay between a release of hydraulic fluid outward through the inlet port and a release of hydraulic fluid from within the piston chamber, wherein the release of hydraulic fluid from within the piston chamber causes the piston to return to the first stroke position and thus actuate the check valve into the open configuration after the amount of delay.

13. The delay valve of claim 12, wherein the check valve is also actuatable into the open configuration by hydraulic pressure when there is a loss of pressure via the outlet port or other components fluidly coupled downstream of the outlet port.

14. The delay valve of claim 12, wherein the flow control valve comprises a resilient closing device naturally-biased in the closed state and configured to be compressed into the open state by hydraulic fluid passing from the inlet port to the first fluid passageway, but to remain closed when hydraulic fluid flows from the first fluid passageway through the gap or orifice to the inlet port.

15. The delay valve of claim 12, wherein the housing further comprises a selectively adjustable protrusion or ledge configured for shouldering the piston at the second stroke position, wherein the second stroke position is adjustable by adjusting a location of the protrusion or ledge within the piston chamber.

16. The delay valve of claim 12, wherein the flow control device further comprises a threaded interface configured for adjusting the size of the adjustable gap or orifice.

17. The delay valve of claim 12, wherein the inlet port and the outlet port are configured for connecting to external feed lines.

18. The delay valve of claim 12, wherein at least one of the inlet port and the outlet port comprises or is fluidly coupled with at least one manifold port configured for connection to a plurality of fluid passages or hydraulic devices.

19. The delay valve of claim 12, wherein the housing has a rod bore formed therethrough and the rod portion of the piston extends through the rod bore, wherein a piston seal is located between the rod portion and the rod bore to prevent hydraulic fluid from leaking out of the piston chamber through the rod bore.

20. A method of providing instantaneous hydraulic flow in a first flow direction to a hydraulic holding device and delayed hydraulic flow in a second flow direction from the hydraulic holding device, the method comprising the steps of:

receiving with an inlet port a flow of hydraulic fluid flowing in the first flow direction toward and through an outlet port to the hydraulic holding device;

holding open a check valve between the inlet port and the outlet port with a rod portion of a piston, wherein the piston is translatable within a piston chamber;

hydraulically opening a flow control valve located between the inlet port and the piston chamber, such that hydraulic fluid continues to flow in the first flow direction and into the piston chamber;

hydraulically translating the piston in the piston chamber in a direction away from the check valve via the hydraulic fluid in the piston chamber, such that the rod portion disengages from the check valve;

closing the check valve such that the hydraulic fluid stops flowing between the inlet port and the outlet port;

closing the flow control valve such that hydraulic fluid stops flowing between the inlet port and the piston chamber therethrough;

releasing hydraulic fluid through the inlet port in the second flow direction;

releasing hydraulic fluid from the piston chamber into the inlet port in the second flow direction through at least one orifice that fluidly couples the piston chamber and the inlet port even while the flow control valve remains closed;

hydraulically translating the piston in the piston chamber in a direction toward the check valve via the release of the hydraulic fluid from the piston chamber, such that the rod portion engages the check valve after a delay time proportional to at least one of the size of the at least one orifice, a stroke length of the piston, and a viscosity of the hydraulic fluid; and opening the check valve via mechanical force by the rod portion of the piston after the delay time, thereby releasing hydraulic fluid from the outlet port and the hydraulic holding device in the second flow direction toward the inlet port.

* * * * *